United States Patent Office 2,932,628
Patented Apr. 12, 1960

2,932,628

PROMOTERS FOR EMULSION POLYMERIZATION SYSTEMS CONTAINING OXYGEN

Carl A. Uraneck, Phillips, and Alvin C. Rothlisberger, Borger, Tex., assignors to Phillips Petroleum Company, a corporation of Delaware No Drawing. Application June 8, 1953
Serial No. 360,377

18 Claims. (Cl. 260—84.1)

This invention relates to the emulsion polymerization of organic compounds. In a more specific aspect this invention relates to the inhibiting effect of free oxygen in polymerization systems, and particularly, to promoters for such systems.

It is known in the art that the presence of small quantities of free oxygen in emulsion polymerization systems, particularly in redox emulsion polymerization systems, i.e., systems containing specific oxidizing and reducing components, exerts a retarding and/or inhibiting effect on the polymerization. This inhibiting effect of free oxygen is known to occur in polymerization reactions carried out over a broad temperature range, but is particularly noticeable at temperatures below 40° C.

An object of this invention, therefore, is to effect the polymerization of organic compounds in the presence of an amount of free oxygen which would otherwise inhibit such polymerization. A further object is to provide promoters for such emulsion polymerization systems containing a deleterious amount of free oxygen.

We have discovered that the retardation and/or inhibition frequently occurring when free oxygen is present in emulsion polymerization systems can be overcome, and excellent conversion rates obtained, by addition to the polymerization system of various oxygenated aromatic compounds which serve as promoters for the polymerization. This discovery is the more unexpected because certain of these oxygenated organic compounds have been disclosed in the art to be themselves inhibitors for such polymerization systems. The oxygenated aromatic compounds which are in accordance with our invention are selected from the group consisting of quinone, hydroquinone, hydroxyhydroquinone, resorcinol, pyrogallol and phloro glucinol, and methyl-, chloro-, bromo-, carboxy- and sulfonic-substituted derivatives thereof, in which not more than two of the said substituents, which may be alike or different, are present. Specific compounds in which these various substituents are present include chlorohydroquinone, methylhydroquinone (2,5 - dihydroxytoluene), chloroquinone, 2,5-dihydroxybenzoic acid, 3,5-dihydroxysulfonic acid, and 2,4,6-trihydroxybromobenzene.

The polymerization reactions to which this invention is applicable are effected at temperatures ranging from 70° C. to —40° C. It is frequently desirable to include water-soluble antifreeze components in the aqueous phase, particularly in order to depress the freezing point when the polymerization temperature is below the normal freezing point of water. Inorganic salts and alcohols can be so used. Examples of suitable salts are those of ammonium, and alkali and alkaline earth metals, including chlorides, nitrates, sulfates, etc. Alcohols which are applicable comprise water-soluble compounds of both monohydric and polyhydric types, including methanol, ethylene glycol, glycerol and erythritol, by way of example.

It is generally preferred that the emulsion be of an "oil in water" type, with the ratio of aqueous medium to monomeric material between about 0.5:1 and about 2.75:1, in parts by weight. As was stated above, it is frequently desirable to include water-soluble components in the aqueous phase, particularly when the polymerization temperatures are below freezing and inorganic salts and alcohols can be so used, as indicated hereinabove. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150 to 200 parts. In cases where it is desired to use a larger quantity of the alcohol-water mixture, say around 250 parts, the amount of alcohol can be increased to as much as 120 parts. It is preferred that the alcohol be such that it is substantially insoluble in the non-aqueous phase, and that 90 percent, or more, of the alcohol present be in the aqueous phase. A high-boiling alcohol such as glycerine is difficult to recover from the resulting serum; a low-boiling alcohol such as methanol is easily removed and frequently preferred. Other aliphatic alcohols which are higher-boiling than methanol, such as propanol, are frequently less satisfactroy.

In the practice of the invention suitable means will be necessary to establish and maintain an emulsion and to remove reaction heat to maintain a desired reaction temperature. The polymerization can be conducted in batches, semicontinuously, or continuously. The total pressure on the reactants is preferably at least as great as the total vapor pressure of the mixture, so that the initial reactants will be present in liquid phase.

Emulsifying agents which are applicable in these low temperature polymerizations are materials such as potassium laurate, potassium oleate, and the like, and salts of rosin acids. Particularly useful are the specific mixtures of salts of fatty acids and of rosin acids, which seem to have a synergistic action when used with some of these same hydroperoxides, as more fully disclosed and claimed by Charles F. Fryling and Archie E. Follett in their application Serial No. 72,534, filed January 24, 1949. However, other emulsifying agents, such as nonionic emulsifying agents, salts of alkyl aromatic sulfonic acids, salts of alkyl sulfates, and the like which will produce favorable results under the conditions of the reaction, can also be used in practicing the invention, either alone or in admixture with soaps. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts by weight per 100 parts of monomeric material will be found to be sufficient.

In general, the pH of the aqueous phase may be varied over a fairly wide range. The process of our invention is applicable to polymerization systems having a pH from about 4 to about 12; however, it is preferred that the pH be in the range of 9.0 to 12.0, or higher.

When carrying out polymerization reactions according to the process of this invention, it is frequently considered desirable to include an electrolyte in the system, such as potassium chloride, trisodium phosphate, or other salt which will not produce deleterious effects. One function of an electrolyte is to increase the fluidity of the latex, and it also reduces precoagulation. Generally the amount of such salt will not exceed one part by weight per 100 parts of monomers.

The promoters of this invention are usually applied to polymerization systems having a pH of 9 or higher wherein free oxygen produces retarding and/or inhibiting effect. Examples of polymerization recipes to which the method of our invention is applicable comprise the redox-type, comprising hydroperoxides or peroxides with heavy metal salts, peroxamine-type, comprising perodixic materials with polyamines, and persulfate-type recipes. As is shown in the accompanying data, polymerization reactions are greatly retarded and/or inhibited by the presence of as little as 0.1 millimole of free oxygen per 100 grams of monomers.

A preferred embodiment of the method of our invention is in a low temperature polymerization recipe comprising a multivalent metal oxidation catalyst, e.g., one containing ferrous iron. In such a recipe the method of our invention is particularly effective when the polymerization temperature is in the range of 0 and 40° C. In all of the polymerization recipes utilized herein the retarding effect of the free oxygen was found to be negatived by the use of the promoters of this invention. We wish to emphasize that the above stated amount of free oxygen which retarded polymerization in the runs reported in our data, hereinafter, is illustrative, only, since it is well known in the art that very small amounts of free oxygen have a deleterious effect, and further, that the amount of oxygen which will cause such a deleterious effect varies widely with other variables in the polymerization system, e.g., the polymerization recipe and the polymerization temperature.

As was stated hereinbefore, one of the recipes for polymerization to which our invention applies utilizes activator-reductants comprising polyalkylenepolyamines, and in this case preferred polyalkylene polyamines are the ethylene polyamines and the trimethylene polyamines, as well as the carbamates of these materials. The ethylene polyamines can be compounds such as ethylenediamine, diethylenetriamine, aminoethylethanolamine, ethylenemethylethylenetriamine. tetraethylenepentamine, and the like. These compounds have the general formula $RHN(CHXCHXNH)_m(CHXCHX)_nNHR$ where each R contains not more than eight carbon atoms and is of the group consisting of hydrogen, aliphatic, cycloaliphatic, aromatic, olefinic, and cycloolefinic radicals, and each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and can be of mixed character when containing six or more carbon atoms, such as alkyl, cycloalkyl, aralkyl, alkaryl groups, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i.e., mercapto compounds and thioethers) and halogen compounds. Carbamates of each of the foregoing are also useful.

The trimethylene polyamines, also referred to as 1,3-diaminopropanes, employed in the polymerization systems herein described are preferably those represented by the formula

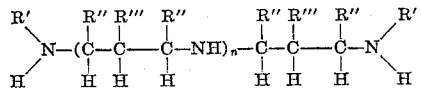

where each R′ is one of the group consisting of hydrogen, methyl, ethyl, hydroxymethyl, hydroxyethyl, and carboxyl radicals, each R″ is hydrogen or methyl, and each R‴ is hydrogen, methyl, or an activating substituent of the group consisting of —OR, —SR, —NR₂, —CN, —SCN, —COOR, —CHO, with R being hydrogen, methyl, ethyl, n-propyl, or isopropyl, or —CHR‴— can be C=O, and $n$ is an integer between 0 and 8, inclusive. In order to obtain optimum results, the polyamino compound must be of such nature that substantial amounts are present in the aqueous phase. The distribution of the polyamino compound between the aqueous and oil phases appears to be an important factor in determining the extent of the activating effect of a given compound. In other words, if a major portion of the polyamino compound is in the aqueous phase, the compound will generally be more effective as an activator than when a material of greater oil solubility is employed.

Of the trimethylene polyamines, we much prefer to use the compounds containing a single trimethylene group together with its two terminal amine groups. The simplest of these trimethylene polyamines, or 1,3-diaminopropanes, is 1,3-diaminopropane itself. This compound is also known as trimethylenediamine. Substitution of an —OH or a =O on the central carbon atom of 1,3-diaminopropane appears to enhance the activity in the emulsion polymerization recipes, hence 1,3-diaminoacetone and 1,3-diamino-2-propanol are at present the most preferred compounds of our invention. Other 1,3-diaminopropanes, which contain a plurality of trimethylene (unsubstituted or substituted) groups alternating with amine groups, and which are regarded as polymers of the parent compound, can also be employed; for example tri(trimethylene) tetramine (sometimes erroneously designated as tripropylenetetramine) is considered to be a polymer of trimethylenediamine. All of the trimethylene polyamine compounds of our invention have the basic structure of 1,3-diaminopropane and hence can be broadly referred to as "1,3-diaminopropane and its derivatives and polymers thereof"; they can also be broadly referred to as "1,3-diaminopropanes," and also as "trimethylene polyamines." As indicated hereinabove, it is preferred to use only those which come within the structural formula defined in the preceding paragraph, and all of the compounds so defined are operable in our process to some extent though it will of course be appreciated that the relative activities and efficacies will vary considerably depending upon the size of the molecule and the various constituents thereof, as well as upon the other components and their proportions in the various recipes which may be used. Those skilled in the art will readily ascertain any of the specific compounds which are within the scope of the structural formula. However, by way of example the following are mentioned; 1,3-diaminopropane, 1,3-diaminoacetone, 1,3-diamino-2-propanol, N,N′-dimethyl-1,3-diaminoacetone, N-ethoxy - 1,3-diamino-2-propanol, 1,3-diamino-2-carboxypropane, 1,3-diamino-2-(dimethylamino)-propane, 2,4-diaminopentane, 1,3-diamino-2-cyanopropane, 1,3-diamino-2-mercaptopropane, di(trimethylene)triamine, tri(trimethylene)tetramine, tetra(trimethylene)pentamine, polytrimethylene polyamines in which the amino and trimethylene groups can be substituted as previously mentioned, and carbamates of each of the foregoing.

It is to be understood that each of the foregoing polyamino compounds is by no means necessarily the equivalent of the others, as various types and even individuals within types are found to have characteristics differing to a greater or less extent in low temperature emulsion polymerization recipes.

The amount of polyamino compounds used to obtain optimum results is dependent upon other ingredients in the recipe. Preferred results are usually obtained with between 0.02 to 5 parts by weight of the polyamino compound per 100 parts of monomeric material.

The oxidizing components used in these recipes are preferably trisubstituted hydroperoxymethanes, also hereinafter referred to as hydroperoxides. These compounds are represented by the formula

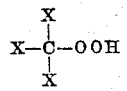

wherein each X, individually, is one of the group consisting of aliphatic, cycloaliphatic, aromatic, olefinic, and cycloolefinic radicals. Each of these radicals can be completely hydrocarbon in character, and can be of mixed character such as aralkyl, alkaryl, and the like, and can also have non-hydrocarbon substituents; particularly useful non-hydrocarbon substitutents include oxygen in the form of hydroxy and ether compounds, sulfur in similar compounds (i.e., mercapto compounds and thioethers), and halogen compounds. Such hydroperoxides can be easily prepared by simple oxidation, with free oxygen, of the corresponding hydrocarbon or hydrocarbon derivative, i.e., of the parent trisubstituted methane. If desired the hydroperoxides can be used in the form of their alkali metal salts. Among the preferred trisubstituted hydroperoxy methanes are those containing from 10 to 30 carbon atoms per molecule, as disclosed and claimed in copending application Serial No. 107,638, filed July 29, 1949. Further examples of suitable hydroperoxides which can be used are: trialkyl hydroperoxymethanes having from 6 to 9 carbon atoms per molecule, alkenyl trisubstituted hydroperoxymethanes having from 6 to 30 carbon atoms, hydroperoxides of octahydrophenanthrene and its derivatives, hydroperoxides of alkyl tetralins and their derivatives, aryl cyclohexyl hydroperoxides, tertiary butyl hydroperoxide. In addition to or instead of hydroperoxides, organic peroxides can be used as the oxidant material, benzoyl peroxide being perhaps the most widely used of the many organic peroxides known. In general, when the material acting as an oxidant in our recipes is a peroxidic-type material, it can be generically described by the formula R'OOR" where R' is one of the group alkyl, aryl, acyl, aralkyl, and cycloalkyl and R" is one of the group hydrogen, alkyl, aryl, acyl, aralkyl, and cycloalkyl; the named hydrocarbon radicals can also contain olefinic bonds in an aliphatic chain and/or be substituted by non-hydrocarbon groups as indicated hereinabove in more detail with respect to the trisubstituted hydroperoxymethanes.

The amount and type of hydroperoxymethane used to obtain an optimum reaction rate will depend upon the polymerization recipe used and upon the reaction conditions. The amount is generally expressed in millimols per 100 parts of monomeric material, using in each instance the same units of weight throughout, i.e. when the monomeric material is measured in pounds the hydroperoxymethane is measured in millipound mols. The same is true for other ingredients in the polymerization recipe. An optimum rate of polymerization is usually obtained with the amount of hydroperoxymethane between 0.1 and 10 millimols per 100 parts by weight of monomeric material.

In other recipes a composition is used which comprises one compound which is an oxidation catalyst, or activator, and another different compound which is a reductant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like. In addition, other compounds such as hydrazine and polyamines will function as reductants. The multivalent metal ion of the oxidation catalyst can easily and readily pass from a low valence state to a higher valence state, and vice versa. Sometimes this compound, when present in its lower valence state, can function in the dual role of reductant and oxidation catalyst. One commonly used oxidation catalyst is an iron pyrophosphate, and is separately made up in aqueous solution from a ferrous salt, such as ferrous sulfate, and a pyrophosphate of an alkali metal, such as sodium or potassium.

When a ferrous pyrophosphate activator is used, it is preferably prepared by admixing a ferrous salt, such as ferrous sulfate, with a pyrophosphate of an alkali metal, such as sodium or potassium, and water and heating this mixture, preferably for the length of time required for maximum activity. A reaction occurs between the salts, as evidenced by the formation of a grayish-green precipitate at sufficiently high concentrations of ingredients. When preparing the activator the mixture is generally heated above 50° C., for variable periods depending upon the temperature. For example, if the mixture is boiled, a period of twenty minutes or less is sufficient to produce the desired activity, and the time of boiling may even be as low as 30 seconds. One convenient method of operation involves maintaining the temperature of the activator solution at about 60° C. for a period of heating ranging from 10 to 30 minutes. Prior to heating the activator mixture the vessel is usually flushed with an inert gas such as nitrogen. In general it is preferred to heat the mixture below the boiling point, say at a temperature around 55 to 75° C.

In cases where the activator is prepared just prior to use, it is generally employed in the form of an aqueous dispersion as described above. However, the solid activator may be isolated and the crystalline product used, and in this form it is preferred in some instances. Subsequent to heating the activator mixture, it is cooled to around room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the polymerizable monomeric material. This crystalline material is believed to be a sodium ferrous pyrophosphate complex, such as might be exemplified by the formula $2Na_2FeP_2O_7 \cdot Na_4P_2O_7$, or perhaps $Na_2FeP_2O_7$. In any event the complex, whatever its composition, is only slightly soluble in water and is one active form of ferrous ion and pyrophosphate which can be successfully used in our invention. It may be incorporated in the polymerization mixture as such, or dissolved in sufficient water to produce solution. Other forms of multivalent metal and pyrophosphate may also be used, so long as there is present in the reacting mixture a soluble form of a multivalent metal, capable of existing in two valence states and present primarily in the lower of two valence states, and a pyrophosphate.

As previously stated, it is usually desirable that the multivalent metal be present in its lower valence state. With some recipes, it is unnecessary to include an organic reducing agent either in the activator solution or in the polymerization mixture. However, particularly at temperatures above 32° F., a faster reaction is sometimes obtained with some recipes when a small amount of an organic reducing agent, such as a reducing sugar, is included in the polymerization recipe, and it is frequently more desirable to incorporate this in the reaction system by first including it in the activator solution along with the other ingredients. When the multivalent ion is present in its higher valence state, it is usually necessary to include in the activator solution an organic reducing agent. As a result the multivalent ion will be partially reduced and a substantial amount of the multivalent ion will be present in its lower valence state when the activator solution is ready for addition to the polymerization mixture.

In effecting the emulsion polymerization of a monomeric material, particularly when a batch-type or semi-batch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

The monomeric material polymerized to produce polymers by the process of this invention comprises unsaturated organic compounds which generally contain the characteristic structure $CH_2=C<$ and, in most cases, have at least one of the disconnected valences attached to an electronegative group, that is, a group which increases the polar character of the molecule such as a chlorine group or an organic group containing a double or triple bond such as vinyl, phenyl, cyano, carboxy or the like. Included in this class of monomers as at least one of the ingredients of our synthetic rubber recipes are the conjugated butadienes or 1,3-butadienes, for example butadiene (1,3-butadiene), 2,3-dimethyl-1,3-butadiene, isoprene, piperylene, 2-furyl-1,3-butadiene, 2-methoxy-1,3-butadiene, the haloprenes including chloroprene (2-chloro-1,3-butadiene), bromoprene, methyl chloroprene (2-chloro-3-methyl-1,3-butadiene), and the like. Materials which can, if desired, be copolymerized with the butadiene component include aryl olefins such as styrene, various alkyl styrenes, p-cholor-styrene, p-methoxy-styrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described.

In carrying out polymerization reactions by the process of this invention, it is sometimes desirable to use a polymerization modifying agent. Preferred polymerization modifiers for use in the process of the present invention are alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, the amount of and the particular hydrocarbon additive used, and the results desired. In general, the greater modification is obtained when operating at low temperatures and therefore a smaller amount of mercaptan is added to yield a product of a given Mooney value, then is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification when using no hydrocarbon additive is obtained with 0.05 to 3.0 part mercaptan per 100 parts monomers, but smaller or larger amounts can be employed in some instances. In accordance with the present invention, less than the normal quantity of mercaptan is used. Thus, a preferred range of mercaptan is from 0 to 0.5 part per 100 parts monomers.

One method which is employed when operating according to the process of our invention comprises charging the emulsifier solution to the reactor followed by the monomers and modifying agent. The reactor contents are then cooled to polymerization temperature, the reactor is pressured to about 30 p.s.i.g. with an inert gas such as nitrogen, and the desired quantity of promoter is introduced. The mixture is then agitated for a period in the range from 5 to 60 minutes, more frequently between 10 and 30 minutes, while the temperature is maintained at the level at which polymerization is to be effected. The initiator and activator solutions are then added and polymerization effected by agitating the mixture and maintaining the temperature at the desired level. Various alterations can be made in the charging procedure but it is generally preferred that the reaction promoter be contacted with the emulsifier solution and monomers prior to charging the activator and initiator ingredients.

In some instances, particularly when the polymerization is to be effected at temperatures below 5° C., it is preferred to charge the promoter to the mixture of emulsifier solution, monomers, and modifier at room temperature, agitate at room temperature for a period in the range from 5 to 60 minutes, generally between 10 and 30 minutes, and then adjust the temperature to the level at which polymerization is to take place.

In the practice of our invention we have found that the quantity of promoter required for optimum results will vary with the particular promoter employed, the polymerization recipe (including monomers), polymerization temperature, and the amount of oxygen present. The amount of promoter will generally be in the range from 0.2 to 1.5 moles per mole of oxygen present.

It might appear that the promoters of this invention are merely reducing agents that are added to react with the oxygen prior to introducing the activator and initiator ingredients. If this were true, it would be necessary to add the stoichiometric amount of promoter required to combine with the oxygen present. That this is not the case is evidenced by a study of hydroquinone as a promoter. Stoichiometrically, two moles of hydroquinone should be required per mole of oxygen. In a 5° C. emulsion polymerization system containing 0.3 millimole of ferrous pyrophosphate activator, the amount of hydroquinone required for optimum results is 0.5 mole per mole of oxygen present.

EXAMPLE I

A series of runs was made to ascertain the retarding and/or inhibiting effect of free oxygen in an emulsion polymerization process and to show the effect of variable quantities of hydroquinone as a promoter in a polymerization system containing free oxygen. The following recipe was employed and the polymerization temperature was 5° C.

| | Parts by weight |
|---|---|
| Butadiene | 70 |
| Styrene | 30 |
| Water | 180 |
| Dresinate 214 [1] | 4.5 |
| $Na_3PO_4.12H_2O$ | 0.50 |
| Daxad 11 [2] | 0.10 |
| Tert-$C_{12}$ mercaptan | 0.20 |
| Tert-butylisopropylbenzene hydroperoxide | 0.069 |
| $K_4P_2O_7$ [3] | 0.099 |
| $FeSO_4.7H_2O$ | 0.083 |

[1] Rosin soap, K salt.
[2] Sodium salt of a condensed alkyl aryl sulfonic acid.
[3] The activator solution was prepared by dissolving the ferrous sulfate in 10 parts of water which had been made acidic (pH 3.0–3.5) with five percent sulfuric acid. The potassium pyrophosphate was added and the mixture was heated to 140° F. and cooled immediately to room temperature.

The results of the runs showing the inhibiting effect of free oxygen is shown in Table 1.

Table 1

| Run No. | Oxygen Per 100 Grams Monomers | | Conversion, Percent | | | |
|---|---|---|---|---|---|---|
| | Ml. | Mmole | 1.5 Hours | 3 Hours | 6 Hours | 22.2 Hours |
| 1 | 0 | 0 | 11 | 23 | 45 | 78 |
| 2 | 2 | 0.09 | 8 | 17 | 37 | 84 |
| 3 | 3 | 0.13 | 8 | 18 | 38 | 82 |
| 4 | 4 | 0.18 | 6 | 16 | 35 | 80 |
| 5 | 7 | 0.31 | 0 | 6 | 15 | 19 |
| 6 | 11 | 0.49 | 0 | 0 | 3 | 6 |
| 7 | 12.5 | 0.56 | 0 | 0 | 2 | 6 |
| 8 | 14 | 0.62 | 0 | 0 | 0 | 1 |

Results of the runs made to demonstrate the effectiveness of hydroquinone as a promoter are presented in Table 2 and the following procedure was utilized.

The emulsifier solution (pH 10.8) and trisodium phosphate were charged to the reactor first, followed by the styrene and mercaptan. At least 15 percent excess butadiene was added and, after venting the excess, thus sweeping out the air, the reactor was closed and the contents cooled to 5° C. The reactor was then pressured to 30 p.s.i.g. with nitrogen. The desired amount of oxygen was then injected into the reactor and an aqueous solution containing hydroquinone was introduced. The reactor contents were agitated for 20 minutes while the temperature was maintained at 5° C. The hydroperoxide was added and finally the activator solution. The reactants were agitated throughout the polymerization period and the temperature was held at 5° C. For control purposes runs were made with and without oxygen and also with variable amounts of hydroquinone in the absence of oxygen.

Table 2

| Run No. | Oxygen Per 100 Grams Monomers | | Hydroquinone | | Conversion, Percent | | |
|---|---|---|---|---|---|---|---|
| | Ml. | Mmole | Parts | Mmole | 2 Hrs. | 4.5 Hrs. | 21 Hrs. |
| 1 | 0 | 0 | 0 | 0 | 13 | 32 | 88 |
| 2 | 0 | 0 | 0.005 | 0.045 | 8 | 24 | 86 |
| 3 | 0 | 0 | 0.010 | 0.090 | 9 | 25 | 85 |
| 4 | 0 | 0 | 0.020 | 0.180 | 11 | 12 | 47 |
| 5 | 0 | 0 | 0.040 | 0.360 | 8 | 14 | 28 |
| 6 | 8 | 0.36 | 0 | 0 | 1 | 8 | 12 |
| 7 | 8 | 0.36 | 0.005 | 0.045 | 0 | 7 | 17 |
| 8 | 8 | 0.36 | 0.010 | 0.090 | 2 | 15 | 68 |
| 9 | 8 | 0.36 | 0.020 | 0.180 | 5 | 20 | 81 |
| 10 | 8 | 0.36 | 0.040 | 0.360 | 8 | 19 | 37 |

EXAMPLE II

The recipe of Example I was employed to study the effect of hydroquinone and sodium dithionite in polymerization systems containing oxygen. For comparative purposes the following types of runs were made: (1) with and without oxygen and in the absence of both sodium dithionite and hydroquinone; (2) with sodium dithionite alone in the presence of oxygen; and (3) with hydroquinone alone in the presence of oxygen. The procedure described in Example I was followed with the temperature being maintained at 5° C. The results are presented below in Table 3.

Table 3

| Run No. | Ingredients Per 100 Grams Monomers | | | | Conversion, Percent | | |
|---|---|---|---|---|---|---|---|
| | Oxygen | | Na₂S₂O₄·2H₂O Mmole | Hydroquinone Mmole | 2 Hours | 4.5 Hours | 21 Hours |
| | Ml. | Mmole | | | | | |
| 1 | 0 | 0 | 0 | 0 | 13 | 32 | 85 |
| 2 | 8 | 0.36 | 0 | 0 | 0 | 10 | 14 |
| 3 | 8 | 0.36 | 0.18 | 0 | 0 | 12 | 25 |
| 4 | 8 | 0.36 | 0 | 0.180 | 5 | 18 | 81 |

These results show that hydroquinone is a much more effective promoter in systems containing free oxygen than is sodium dithionite.

EXAMPLE III

Runs were made similar to those in Example I using the same recipe and procedure but employing variable quantities of quinone instead of hydroquinone as a polymerization promoter in the presence of oxygen. The temperature was maintained at 5° C. Results which were obtained are presented below in Table 4.

Table 4

| Run No. | Ingredients Per 100 Grams Monomers | | | Conversion, Percent | | |
|---|---|---|---|---|---|---|
| | Oxygen | | Quinone, Mmole | 2 Hours | 7 Hours | 19 Hours |
| | Ml. | Mmole | | | | |
| 1 | 0 | 0 | 0 | 10 | 43 | 91 |
| 2 | 0 | 0 | 0.09 | 7 | 29 | 80 |
| 3 | 0 | 0 | 0.18 | 6 | 25 | 60 |
| 4 | 0 | 0 | 0.37 | 4 | 20 | 37 |
| 5 | 0 | 0 | 0.56 | 4 | 18 | 26 |
| 6 | 0 | 0 | 0.74 | 6 | 17 | 21 |
| 7 | 8 | 0.36 | 0 | 0 | 16 | 30 |
| 8 | 8 | 0.36 | 0.09 | 0 | 16 | 44 |
| 9 | 8 | 0.36 | 0.18 | 0 | 19 | 64 |
| 10 | 8 | 0.36 | 0.37 | 0 | 23 | 69 |
| 11 | 8 | 0.36 | 0.56 | 0 | 25 | 66 |
| 12 | 8 | 0.36 | 0.74 | 3 | 23 | 35 |

EXAMPLE IV

A series of runs was made to study the effect of pyrogallol and chlorohydroquinone as promoters in a polymerization system containing oxygen. Copolymerization of butadiene with styrene was effected at 5° C. in accordance with the recipe and procedure described in Example I. For comparative purposes runs were made with and without oxygen but in the absence of a promoter. The remaining runs were made using a constant quantity of oxygen but variable amounts of promoter. The results of these runs are presented below in Table 5.

Table 5

| Run No. | Oxygen Per 100 Grams Monomers | | Promoter | | Conversion, Percent | | | |
|---|---|---|---|---|---|---|---|---|
| | Ml. | Mmole | Type | Mmole | 2 Hrs. | 5 Hrs. | 10 Hrs. | 21.5 Hrs. |
| 1 | 0 | 0 | None | 0 | 12 | 34 | 69 | 94 |
| 2 | 8 | 0.36 | do | 0 | 0 | 2 | 3 | 4 |
| 3 | 8 | 0.36 | Pyrogallol | 0.09 | 0 | 7 | 18 | 36 |
| 4 | 8 | 0.36 | do | 0.18 | 2 | 16 | 40 | 79 |
| 5 | 8 | 0.36 | do | 0.36 | 6 | 28 | 64 | 88 |
| 6 | 8 | 0.36 | do | 0.54 | 5 | 27 | 47 | 64 |
| 7 | 8 | 0.36 | do | 0.72 | 7 | 26 | 33 | 37 |
| 8 | 8 | 0.36 | Chlorohydroquinone | 0.09 | 0 | 11 | 27 | 60 |
| 9 | 8 | 0.36 | do | 0.18 | 2 | 18 | 39 | 81 |
| 10 | 8 | 0.36 | do | 0.36 | 9 | 12 | 24 | 24 |
| 11 | 8 | 0.36 | do | 0.54 | 8 | 15 | 16 | 18 |

EXAMPLE V

Runs were made to study the effect of pyrogallol as a promoter in a polyamine system containing oxygen. The following basic recipe was employed and the polymerization temperature was 5° C.

| | Parts by weight |
|---|---|
| Butadiene | 70 |
| Styrene | 30 |
| Water | 180 |
| Dresinate 214 [1] | 4.5 |
| KCl | 0.50 |
| KOH | 0.13 |
| Tert-C₁₂ mercaptan | 0.20 |
| Tert-butylisopropylbenzene hydroperoxide | 0.104 |
| Tetraethylenepentamine | 0.047 |

[1] Rosin soap, K salt.

The emulsifier solution (pH 11.6), potassium chloride, and potassium hydroxide were dissolved together and charged to the reactor followed by the styrene and mercaptan. At least 15 percent excess butadiene was added and after venting the excess, thus sweeping out the air, the reactor was closed and the contents cooled to 5° C. The reactor was then pressured to 30 p.s.i.g. with nitrogen. The desired amount of oxygen was then injected into the reactor and an aqueous solution containing pyrogallol was introduced. The reactor contents were agitated for 20 minutes while the temperature was maintained at 5° C. The hydroperoxide was added and then an aqueous solution of the tetraethylenepentamine. In some runs Versene (tetra sodium salt of ethylenediamine tetraacetic acid) and ferrous sulfate were also present in the system. These ingredients were charged with the emulsifier solution. The reactants were agitated throughout the polymerization period and the temperature was held at 5° C. For comparative purposes the following types of runs were made:

(1) Absence of oxygen, Versene, ferrous sulfate, and pyrogallol;
(2) Presence of oxygen and absence of other materials in (1);
(3) Presence of oxygen, variable quantities of Versene, and variable quantities of ferrous sulfate;
(4) Presence of oxygen, variable quantities of Versene and ferrous sulfate, and constant amount of pyrogallol;
(5) Absence of oxygen, variable quantities of Versene and ferrous sulfate, and constant amount of pyrogallol.

Results of these runs are presented below in Table 6.

as the promoter. The runs made and results obtained are shown below in Table 8.

*Table 8*

| Oxygen Per 100 Grams Monomers | | Promoter | | Conversion, Percent | |
|---|---|---|---|---|---|
| Ml. | Mmole | Parts | Mmole | 7 Hours | 19 Hours |
| 8 | 0.36 | ----- | ----- | 17 | 22 |
| 8 | 0.36 | 0.010 | 0.062 | 11 | 20 |
| 8 | 0.36 | 0.020 | 0.123 | 17 | 33 |

As will be evident to those skilled in the art, various modifications of this invention can be made, or followed, in the light of the foregoing disclosure and discussion, without departing from the spirit or scope of the disclosure or from the scope of the claims.

We claim:

1. In the emulsion copolymerization of a monomeric material comprising a conjugated diene having not more than 6 carbon atoms per molecule and an organic compound having an active $CH_2=C<$ group, while dispersed in an aqueous medium in a reaction system containing a catalytic composition comprising a trisubstituted hydroperoxymethane and at least one material selected from the group consisting of polyalkylene polyamines and iron salts and in the presence of at least 0.1 millimole free oxygen per 100 grams of monomers, the improvement which comprises adding to said reaction system before copolymerization a promoter in an amount sufficient to reduce the inhibiting effect of the free oxygen but not sufficient to inhibit the copolymerization reaction, said promoter being selected from the group consisting of quinone, hydroquinone, hydroxyhydroquinone, resorcinol, pyrogallol, phloroglucinol, and methyl-, chloro-, bromo-, carboxy- and sulfonic-substituted derivatives thereof, in which not more than two of the said substituents, which may be alike or different, are present and thereafter carrying out the copolymerization reaction.

2. In the emulsion copolymerization of a monomeric material comprising a conjugated diene having not more than 6 carbon atoms per molecule and an organic compound having an active $CH_2=C<$ group, while dispersed in an aqueous medium in a reaction system containing a catalytic composition comprising a tri-substituted hydroperoxymethane and at least one material selected from the group consisting of polyalkylene polyamines and iron salts and in the presence of at least 0.1 millimoles of free oxygen per 100 grams of monomers, the improvement which comprises adding to said reaction system prior to copolymerization a promoter in the amount of in the range from 0.2 to 1.5 moles per mole of free oxygen

*Table 6*

| Run No. | Oxygen Per 100 Grams Monomers | | Versene | | $FeSO_4 \cdot 7H_2O$ | | Pyrogallol | | Conversion, Percent | | | |
|---|---|---|---|---|---|---|---|---|---|---|---|---|
| | Ml. | Mmole | Part | Mmole | Part | Mmole | Part | Mmole | 2 Hrs. | 5 Hrs. | 10.8 Hrs. | 20.7 Hrs. |
| 1 | 0 | 0 | 0 | 0 | 0 | 0 | 0 | 0 | 6 | 19 | 39 | 62 |
| 2 | 8 | 0.36 | 0 | 0 | 0 | 0 | 0 | 0 | 3 | 10 | 25 | 26 |
| 3 | 8 | 0.36 | 0.015 | 0.04 | 0.006 | 0.02 | 0 | 0 | 1 | 2 | 5 | 7 |
| 4 | 8 | 0.36 | 0.038 | 0.10 | 0.014 | 0.05 | 0 | 0 | 2 | 2 | 4 | 6 |
| 5 | 8 | 0.36 | 0.076 | 0.20 | 0.028 | 0.10 | 0 | 0 | 2 | 3 | 6 | 9 |
| 6 | 8 | 0.36 | 0.015 | 0.04 | 0.006 | 0.02 | 0.045 | 0.36 | 5 | 19 | 36 | 48 |
| 7 | 8 | 0.36 | 0.038 | 0.10 | 0.014 | 0.05 | 0.045 | 0.36 | 12 | 24 | 35 | 45 |
| 8 | 8 | 0.36 | 0.076 | 0.20 | 0.028 | 0.10 | 0.045 | 0.36 | 8 | 16 | 17 | 17 |
| 9 | 0 | 0 | 0.015 | 0.04 | 0.006 | 0.02 | 0.045 | 0.36 | 0 | 0 | 1 | 3 |
| 10 | 0 | 0 | 0.038 | 0.10 | 0.014 | 0.05 | 0.045 | 0.36 | 2 | 8 | 19 | 30 |

EXAMPLE VI

Runs were made to study the effect of resorcinol as a promoter in a 5° C. butadiene-styrene polymerization system containing 8 ml. of oxygen (0.36 millimole) per 100 grams of monomers. The recipe and charging procedure of Example I was followed. Table 7 shows the runs which were made and the results obtained.

*Table 7*

| Oxygen per 100 Grams Monomers | | Promoter | | Conversion, Percent | |
|---|---|---|---|---|---|
| Ml. | Mmole | Parts | Mmole | 5 Hours | 17 Hours |
| 8 | 0.36 | ----- | ----- | 11 | 16 |
| 8 | 0.36 | 0.010 | 0.091 | 12 | 22 |
| 8 | 0.36 | 0.020 | 0.182 | 13 | 25 |

EXAMPLE VII

Runs were made using the recipe and charging procedure of Example I, except that phloroglucinol was used present, said promoter being selected from the group consisting of quinone, hydroquinone, hydroxyhydroquinone, resorcinol, pyrogallol, phloroglucinol, and methyl-, chloro-, bromo-, carboxy- and sulfonic-substituted derivatives thereof, in which not more than two of said substituents, which may be alike or different, are present and thereafter carrying out the copolymerization reaction.

3. The process of claim 2 wherein said promoter is quinone.

4. The process of claim 2 wherein said promoter is hydroquinone.

5. The process of claim 2 wherein said promoter is pyrogallol.

6. The process of claim 2 wherein said promoter is chlorohydroquinone.

7. The process of claim 2 wherein said promoter is resorcinol.

8. In the emulsion polymerization of a monomeric material comprising a major amount of a butadiene hydrocarbon and a minor amount of styrene while dispersed in an aqueous medium in a reaction system containing a catalytic composition comprising a tri-substituted hydroperoxymethane and at least one material selected from the group consisting of polyalkylene polyamines and iron salts in the presence of an inhibiting amount of at least 0.1 millimole of free oxygen per 100 grams of monomers, the improvement which comprises adding to said reaction system prior to polymerization a promoter in an amount sufficient to reduce the inhibiting effect of the free oxygen present but not sufficient to inhibit the polymerization reaction, said promoter being selected from the group consisting of quinone, hydroquinone, hydroxyhydroquinone, resorcinol, pyrogallol, phloroglucinol, and methyl-, chloro-, bromo-, carboxy- and sulfonic-substituted derivatives thereof, in which not more than two of said substituents, which may be alike or different, are present and thereafter carrying out the polymerization reaction.

9. In a process which comprises polymerizing at a temperature between −40° C. and 70° C. an aqueous dispersion of a monomeric material comprising a conjugated diene having not more than 6 carbon atoms per molecule and an organic compound having an active $CH_2=C<$ group, in a reaction system containing a catalyst composition comprising tertiary butyl isopropyl benzene hydroperoxide and an iron salt, and an emulsifying agent, in the presence of free oxygen in an amount sufficient to inhibit said polymerization, the improvement which comprises adding to said reaction system prior to polymerization a promoter in the amount of in the range from 0.2 to 1.5 mols per mol of free oxygen present, said promoter being selected from the group consisting of quinone, hydroquinone, hydroxyhydroquinone, resorcinol, pyrogalllol, phloroglucinol, and methyl-, chloro-, bromo-, carboxy- and sulfonic-substituted derivatives thereof, in which not more than two of said substituents, which may be alike or different, are present and thereafter carrying out the polymerization reaction.

10. In a process which comprises polymerizing at a temperature between −40° C. and 70° C. in an aqueous dispersion of monomeric material comprising a conjugated diene having not more than six carbon atoms per molecule and an organic compound having an active $CH_2=C<$ group, in a reaction system containing a tri-substituted hydroperoxymethane and a polyalkylene polyamine, and an emulsifier agent, in the presence of free oxygen in an amount sufficient to inhibit said polymerization, the improvement which comprises adding to said reaction system prior to polymerization a promoter in the amount of in the range from 0.2 to 1.5 mols per mol of free oxygen present, said promoter being selected from the group consisting of quinone, hydroquinone, hydroxyhydroquinone, resorcinol, pyrogallol, phloroglucinol, and methyl-, chloro-, bromo-, carboxy- and sulfonic-substituted derivatives thereof, in which not more than two of said substituents, which may be alike or different, are present and thereafter carrying out the polymerization reaction.

11. The process of claim 10 wherein said promoter is quinone.

12. The process of claim 10 wherein said promoter is hydroquinone.

13. The process of claim 10 wherein said promoter is pyrogallol.

14. The process of claim 10 wherein said promoter is chlorohydroquinone.

15. The process of claim 10 wherein said promoter is resorcinol.

16. The process which comprises polymerizing at a temperature between 0 and 40° C. an aqueous dispersion of a monomeric material comprising a major amount of a butadiene hydrocarbon and a minor amount of styrene in a reaction system containing at least 0.1 millimole of free oxygen per 100 grams of monomers and a catalyst composition comprising tertiary butylisopropylbenzene hydroperoxide, an iron salt and an emulsifying agent, the improvement which comprises adding to said reaction system prior to polymerization a promoter in an amount of in the range from 0.2 to 1.5 moles per mole of free oxygen present, said promoter being selected from the group consisting of quinone, hydroquinone, hydroxyhydroquinone, resorcinol, pyrogallol, phloroglucinol, and methyl-, chloro-, bromo-, carboxy-, and sulfonic-substituted derivatives thereof, in which not more than two of said substituents, which may be alike or different, are present and thereafter carrying out the polymerization reaction.

17. A process which comprises polymerizing at a temperature between −40 and 70° C. an aqueous dispersion of a monomeric material comprising a major amount of a butadiene hydrocarbon and a minor amount of styrene in a reaction system containing at least 0.36 millimole of free oxygen per 100 grams of monomers, and a catalyst composition comprising a trisubstituted hydroperoxide methane and a polyalkylene polyamine and an emulsifying agent and adding to said reaction system prior to polymerization a promoter in an amount of in the range from 0.2 to 1.5 moles per mole of free oxygen present, said promoter being selected from the group consisting of quinone, hydroquinone, hydroxyhydroquinone, resorcinol, pyrogallol, phloroglucinol and methyl-, chloro-, bromo-, carboxy- and sulfonic-substituted derivatives thereof, in which not more than two of said substituents, which may be alike or different, are present and thereafter carrying out the polymerization reaction.

18. In the emulsion polymerization of a monomeric material comprising a conjugated diene having not more than six carbon atoms per molecule and an organic compound having an active $CH_2=C<$ group in a reaction system containing a tri-substituted hydroperoxymethane, polyalkylene polyamine and an iron salt, and in the presence of an inhibiting amount of at least 0.1 millimole of free oxygen per 100 grams of monomers, the improvement which comprises adding to said reaction system prior to polymerization a promoter in an amount sufficient to reduce the inhibiting amount of the free oxygen present but not sufficient to inhibit the polymerization reaction, said promoter being selected from the group consisting of quinone, hydroquinone, hydroxyhydroquinone, resorcinol, pyrogallol, phloroglucinol, and methyl-, chloro-, bromo-, carboxy- and sulfonic-substituted derivatives thereof, in which not more than two of said substituents, which may be alike or different, are present and thereafter carrying out the polymerization reaction.

(References on following page)

References Cited in the file of this patent

UNITED STATES PATENTS

| | | |
|---|---|---|
| 2,104,760 | Renfrew | Jan. 11, 1938 |
| 2,473,801 | Kropa | June 21, 1949 |
| 2,552,329 | Kropa | May 8, 1951 |
| 2,569,506 | Vandenburg | Oct. 2, 1951 |
| 2,776,295 | Wicklatz et al. | Jan. 1, 1957 |

OTHER REFERENCES

Krczil: Kurzes Handbuch der Polymerisationtechnik, Band 1, Einstoffpolymerisation (1940), Akademische Verlagsgesellschaft. Page 114. Copy in Div. 50.

Brewster: Organic Chemistry, 2nd edition, 1953, page 73.